(12) United States Patent
Marcus

(10) Patent No.: US 7,788,103 B2
(45) Date of Patent: Aug. 31, 2010

(54) RANDOM CONFIRMATION IN SPEECH BASED SYSTEMS

(75) Inventor: Jeffrey N Marcus, Newton, MA (US)

(73) Assignee: Nuance Communications, Inc., Burlington, MA (US)

( * ) Notice: Subject to any disclaimer, the term of this patent is extended or adjusted under 35 U.S.C. 154(b) by 994 days.

(21) Appl. No.: 10/683,017

(22) Filed: Oct. 18, 2004

(65) Prior Publication Data

US 2006/0085184 A1 Apr. 20, 2006

(51) Int. Cl.
G10L 21/00 (2006.01)

(52) U.S. Cl. ............ 704/275; 704/270; 704/270.1

(58) Field of Classification Search ......... 704/251, 704/257, 270–275
See application file for complete search history.

(56) References Cited

U.S. PATENT DOCUMENTS

| | | | | |
|---|---|---|---|---|
| 5,357,596 A * | 10/1994 | Takebayashi et al. | ...... | 704/275 |
| 5,675,707 A * | 10/1997 | Gorin et al. | ...... | 704/257 |
| 5,737,489 A * | 4/1998 | Chou et al. | ...... | 704/256 |
| 5,774,858 A * | 6/1998 | Taubkin et al. | ...... | 704/273 |
| 5,806,040 A * | 9/1998 | Vensko | ...... | 704/273 |
| 5,987,414 A * | 11/1999 | Sabourin et al. | ...... | 704/270 |
| 6,003,002 A * | 12/1999 | Netsch | ...... | 704/236 |
| 6,049,768 A * | 4/2000 | Goldberg et al. | ...... | 704/273 |
| 6,094,476 A * | 7/2000 | Hunt et al. | ...... | 379/88.04 |
| 6,246,981 B1 * | 6/2001 | Papineni et al. | ...... | 704/235 |
| 6,246,986 B1 * | 6/2001 | Ammicht et al. | ...... | 704/270 |
| 6,606,598 B1 * | 8/2003 | Holthouse et al. | ...... | 704/275 |
| 7,383,572 B2 * | 6/2008 | Rolfe | ...... | 726/5 |
| 2002/0111808 A1 * | 8/2002 | Feinberg | ...... | 704/270.1 |
| 2004/0080411 A1 * | 4/2004 | Renfro | ...... | 340/539.1 |

* cited by examiner

Primary Examiner—Richemond Dorvil
Assistant Examiner—Eric Yen
(74) Attorney, Agent, or Firm—Wolf, Greenfield & Sacks, P.C.

(57) ABSTRACT

Method and system are provided for performing random confirmation in a speech system. When a speech recognition result is received with an associated confidence score indicating a level of confidence with respect to the speech recognition result, a confirmation decision is made in terms of whether a confirmation is to be carried out based on the confidence score. The confirmation decision may be made in a random confirmation mode. A confirmation may be performed when the confirmation decision is to carry out a confirmation on the speech recognition result.

23 Claims, 14 Drawing Sheets

RANDOM CONFIRMATION IN SPEECH BASED SYSTEMS

BACKGROUND

1. Field of Invention

The present invention relates to a method and system for confirmation in speech processing and systems incorporating the method. More specifically, the present invention relates to a method and system of random confirmation in speech processing and the systems incorporating the random confirmation method.

2. Discussion of Related Art

The need for automated speech system is growing because of the demand for quality service and the high cost of maintaining a quality service. For example, many companies provide call centers. Such call centers serve as an essential interface between a service provider and its customers through which customers may dial in for services or questions related to services offered by the companies. It is costly to maintain such call centers. It is desirable to automate some of the functionalities of a call center to reduce cost. For example, deploying an automated dialogue system to interact with a customer may significantly reduce the cost in both personnel cost and physical space cost. In such dialogue systems, confirmation is sometimes conducted to improve quality.

FIG. 1 (a) (Prior Art) illustrates a conventional speech system 100 with a deterministic confirmation mechanism. The conventional speech system (with confirmation capability) 100 comprises a speech recognition mechanism 110, a deterministic confirmation decision mechanism 120 which makes a deterministic confirmation decision based on a pre-determined confirmation range of scores 125, and a confirmation mechanism 130 that carries out a confirmation based on the confirmation decision made by the deterministic confirmation decision mechanism 120. The speech recognition mechanism 110 interacts with a user 105 and processes the speech of the user. The speech recognition mechanism 110 may produce words recognized with associated confidence scores indicating the level of confidence that the speech recognition mechanism 110 has in the recognition results.

Based on the confidence score, the deterministic confirmation decision mechanism 120 may decide that a confirmation is required. In this case, a confirmation activation signal 140 is generated to activate the confirmation mechanism 130 to carry out the confirmation. In other situations, the deterministic confirmation decision mechanism 120 may decide that there is no confirmation needed and generate a no confirmation signal 145 to inform a routing mechanism 150 to route the underlying call. A "no confirmation" derision may be reached when either the confidence score indicates a high confidence in the recognition result or the confidence score is too low to carry out a confirmation. If there is a high confidence, the routing mechanism 150 may trigger an automatic response mechanism 170 to respond the user's inquiry. For example, based on the recognition result which corresponds to an inquiry, a pre-stored response may be retrieved from a database as an automated answer to the inquiry. On the other hand, in case of a very low confidence score, the routing mechanism 150 may route the call to a human operator 160 to handle the inquiry.

In a deterministic confirmation scheme, when a confidence score associated with a speech recognition result is within a pre-determined range, a confirmation is performed with the user. FIG. 1 (b) (Prior Art) illustrates such a deterministic confirmation range. The X-axis in FIG. 1 (b) represents the value of a confidence score 175. A confidence score may be within a range between the value 0 and an upper limit max. Within the range of [0, max], it may be further divided into different regions, within each of which different operations may be carried out. For example, a deterministic confirmation range 190 may be defined through a low threshold 180 corresponding to a particular confidence score value and a high threshold 15 corresponding to a higher confidence score value. Under a deterministic confirmation scheme, a speech recognition result with confidence score falling within the deterministic conformation range 190 may need to be confirmed.

The range [0, low threshold 180) may be defined as a rejection range 192 and the range (high threshold 185, max] may be defined as an acceptance range 195. A speech recognition result with a confidence score below the low threshold 180 may be rejected (too low confidence). A speech recognition result with a confidence score exceeding the high threshold 185 may be accepted without confirmation.

In a deterministic confirmation scheme, a speech recognition result from either the rejection range or the acceptance range is not confirmed. Although a speech recognition result with a confidence score that is lower than the low threshold 180 may be rejected, it may still be a correct recognition. On the other hand, a speech recognition result with a confidence score that is higher than the high threshold 185, although accepted, may still be in error. Without confirmation on the speech recognition results within these regions, it may be difficult to assess the performance of the underlying speech system.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 2A:
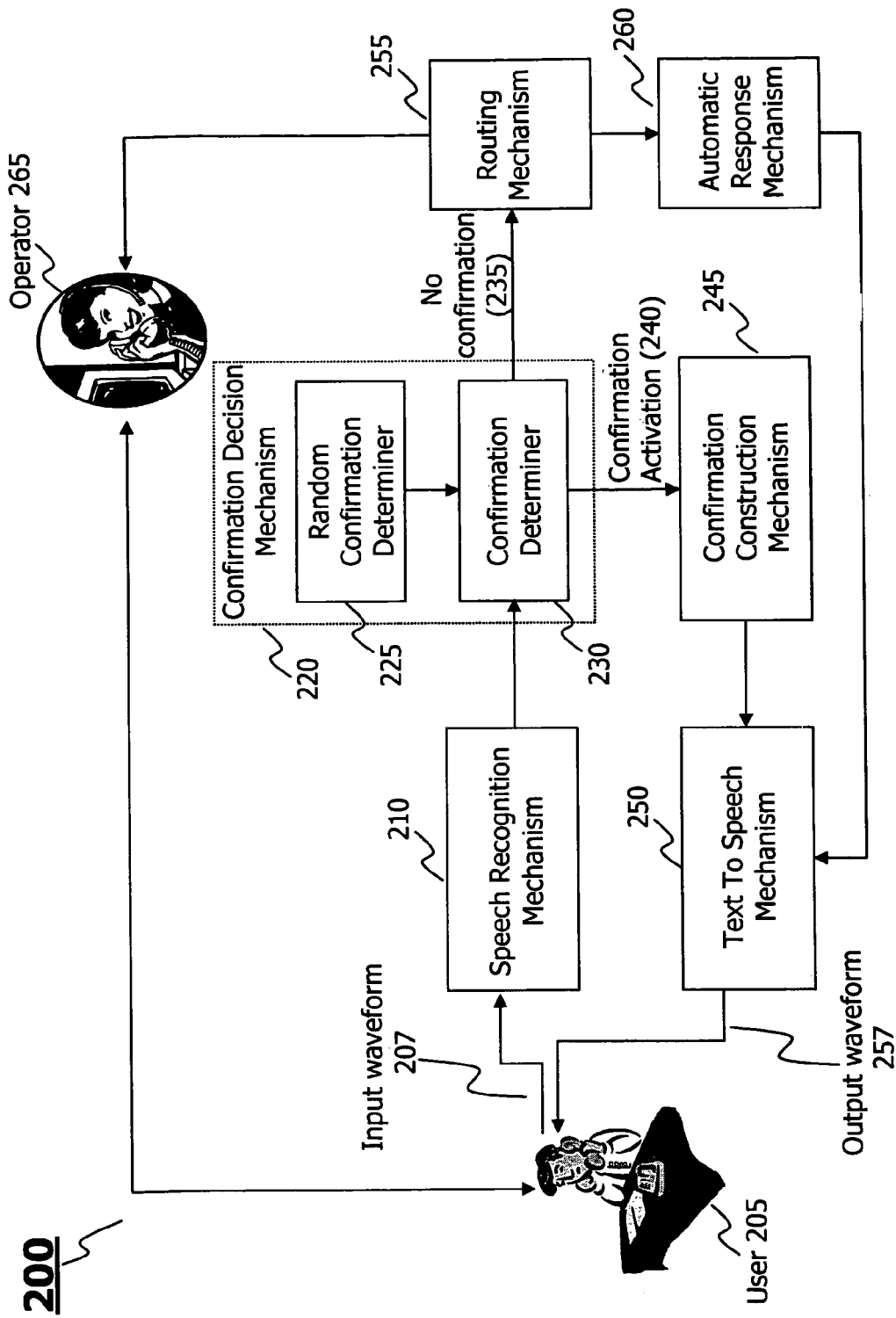
FIG. 2(a) depicts an exemplary speech system with a confirmation mechanism that permits a random confirmation conducted in an automatic fashion, according to at least one embodiment of the present invention.
Figure 2B:
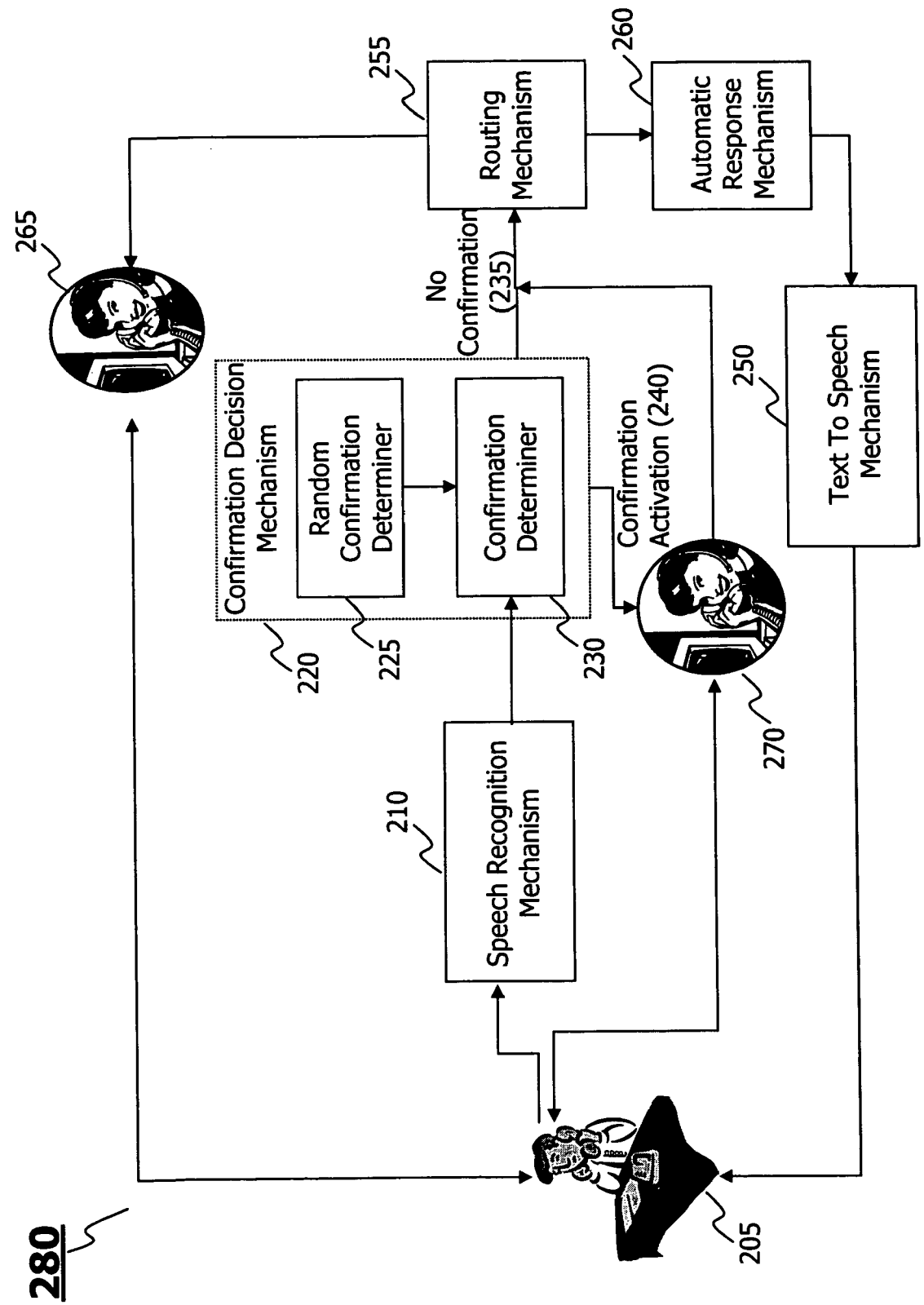
FIG. 2(b) depicts an exemplary speech system with a confirmation mechanism that permits a random confirmation conducted by a human operator, according to at least one embodiment of the present invention.

The present invention involves a configurable confirmation mechanism that provides the capability of performing various configurable confirmation operations on speech recognition results in a speech system. FIG. 2(*a*) depicts an exemplary speech system 200 with a confirmation mechanism that permits a random confirmation conducted in an automatic fashion, according to at least one embodiment of the present invention. The speech system 200 comprises a speech recognition mechanism 210, a confirmation decision mechanism 220, an automatic confirmation mechanism including a confirmation construction mechanism 245 and a text to speech mechanism 250. The speech recognition mechanism 210 may interact with a user 205 based on their speech. The user 205 utters a sentence or a word and the speech may then be recorded and digitized (not shown) to generate an input digital waveform 207 corresponding to the speech.

The input waveform 207 generated from the user's speech may then be sent to the speech recognition mechanism 210 as input. The speech recognition mechanism 210 may process the input digital waveform 207 to produce a word or a sequence of words as a recognition result. Such recognition result may be provided with one or more associated confidence scores indicating a level of confidence that the speech recognition mechanism 210 has in the recognition result. A confidence score may be assigned to every word recognized. For instance, if the user 205 speaks "long distance call", the speech recognition mechanism 210 may recognize the utterance as "wrong distance call" wherein each of the words in the recognized word sequence may have an associated confidence score. The recognized word "wrong" may have a confidence score of 0.6, the recognized word "distance" may have a confidence score of 0.78, and the recognized word "call" may have a confidence score of 0.83.

A confidence score may also be assigned to a phrase. For example, the speech recognition mechanism 210 may assign the entire phrase "wrong distance call" a single score indicating the confidence in recognizing the phrase (as opposed to a single word). In this case, the speech recognition mechanism 210 may include a language understanding mechanism (not shown) that may be capable of recognizing a phrase from a sequence of words and combining confidence scores associated with a plurality of words of the phrase into a single integrated confidence score.

Whether the speech recognition mechanism 210 produces individual words as output or instead produces phrases or even sentences may depend on the needs of particular applications. Some applications may require the speech recognition mechanism 210 to produce results at the word level. For example, an automatic call routing service may direct a caller to select one of a plurality of choices based on individual words by, for instance, stating "please say 'operator' or 'information'". Other applications may require a user to say a phrase such as "local phone service" or "long distance service". In these applications, the speech recognition mechanism 210 may output phrases recognized and a confidence score may be associated with each individual phrase.

There are also applications in which a user may have an open dialogue with free speech. In such applications, the recognition mechanism 210 may be configured to produce a sentence as output. Alternatively, phrases may also be recognized as useful units if the entire application system is configured to utilize such phrases in performing different tasks.

The recognition result from the speech recognition mechanism 210 (which may have one or more associated confidence scores) may then be forwarded to the confirmation decision mechanism 220, which may further make a decision regarding whether a confirmation ought to be performed to verify the recognition result with the user 205. Such a confirmation decision may be made according to different criteria with respect to the confidence score associated with the speech recognition result. Such criteria may be configurable when needed. Further details related to how a confirmation decision may be made are discussed below.

A confirmation may be carried out in different ways. The exemplary speech system 200 depicts an exemplary framework, which supports automated confirmation. Automated confirmation may be realized using existing text to speech technologies. In this case, when the confirmation decision mechanism 220 determines that a confirmation is to be performed on the speech recognition result, the confirmation decision mechanism 220 activates, via a confirmation activation signal 240, a confirmation construction mechanism 245 to carry out an automated confirmation.

Upon being activated, the confirmation construction mechanism 245 may construct a specific confirmation scenario based on the speech recognition result. A specific confirmation scenario may correspond to a textual string. For example, if the speech recognition result is a recognized word "billing" with a confidence score 0.45, a constructed confirmation scenario may correspond to a textual string "Did you say 'billing'?" The constructed confirmation scenario is then forwarded to the text to speech mechanism 250, which may then produce an output waveform 257 corresponding to the sequence of spoken words "Did you say 'billing'?"

When the waveform output 257 is played back to the user 205, the user 205 may either affirm or disaffirm the speech recognition result "billing". The confirmation response from the user 205 may then be treated as another input speech utterance, which is digitized and forwarded to the speech recognition mechanism 210. When the speech recognition mechanism 210 recognizes an affirmative response (e.g., recognizing that the user said "yes"), the speech recognition result "billing" is confirmed (if there is no need to further confirm the response). The response may also need to be confirmed, determined by the confirmation decision mechanism 220. In this case, the confirmation construction mechanism 245 and the text to speech mechanism 250 further perform an automatic confirmation.

The user 205 may also disaffirm the speech recognition result. In this case, the disaffirmed response from the user 205 may also need to be recognized with high confidence before further action is taken. Such a negative response may then be used to discredit the speech recognition result produced earlier.

When the confirmation decision mechanism 220 determines that no confirmation is to be performed on the speech recognition result, the confirmation decision mechanism 220 generates a "no confirmation" signal 235. Depending on the application, such a no confirmation signal may be forwarded to other mechanisms to carry out the next processing accordingly. For example, in an automatic call routing application (as illustrated in FIG. 2(*a*)), the no confirmation signal 235 may be forwarded to a routing mechanism 255.

Figure 1A:
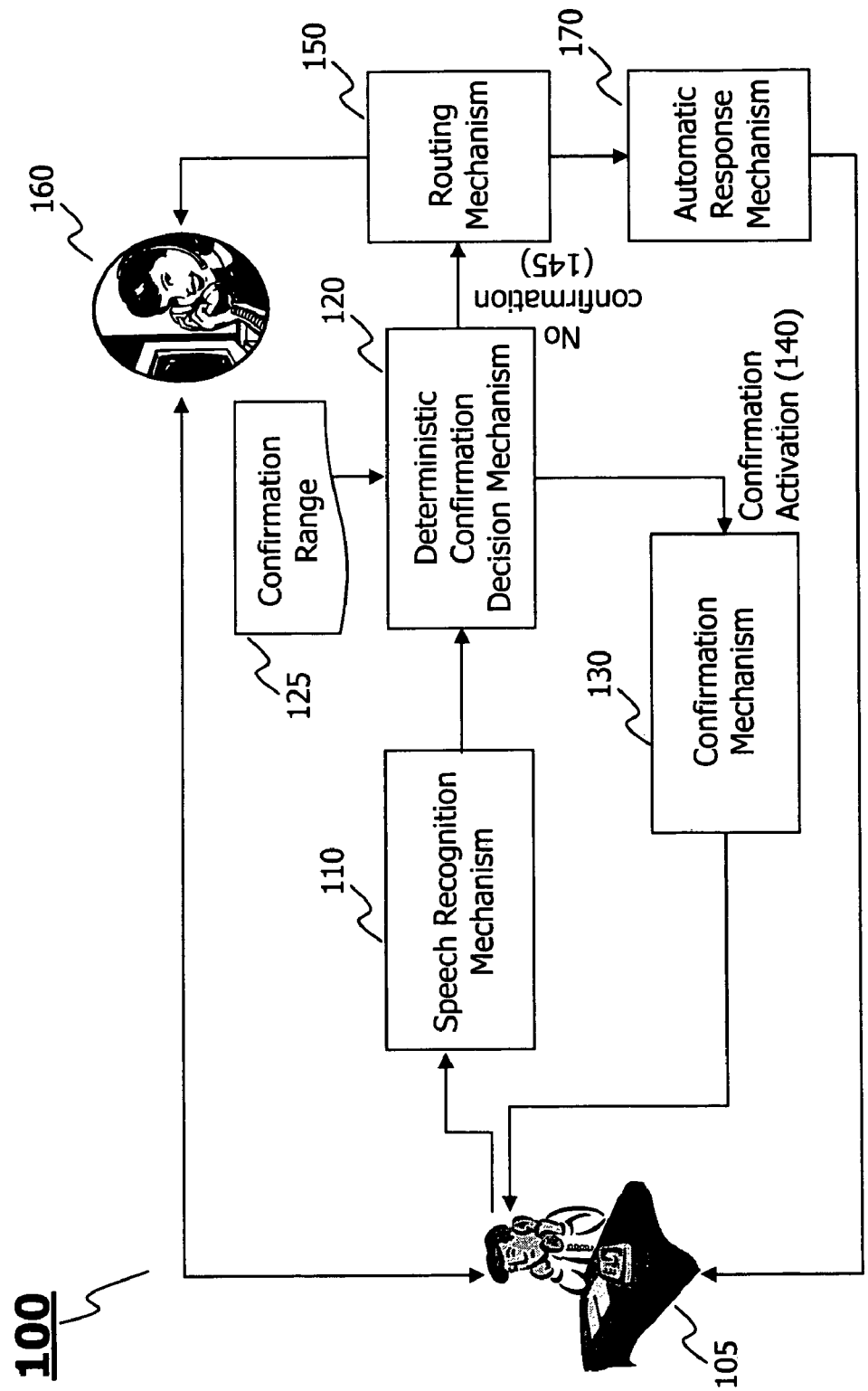
FIG. 1(a) (Prior Art) depicts a conventional speech system with a confirmation mechanism.
Figure 1B:
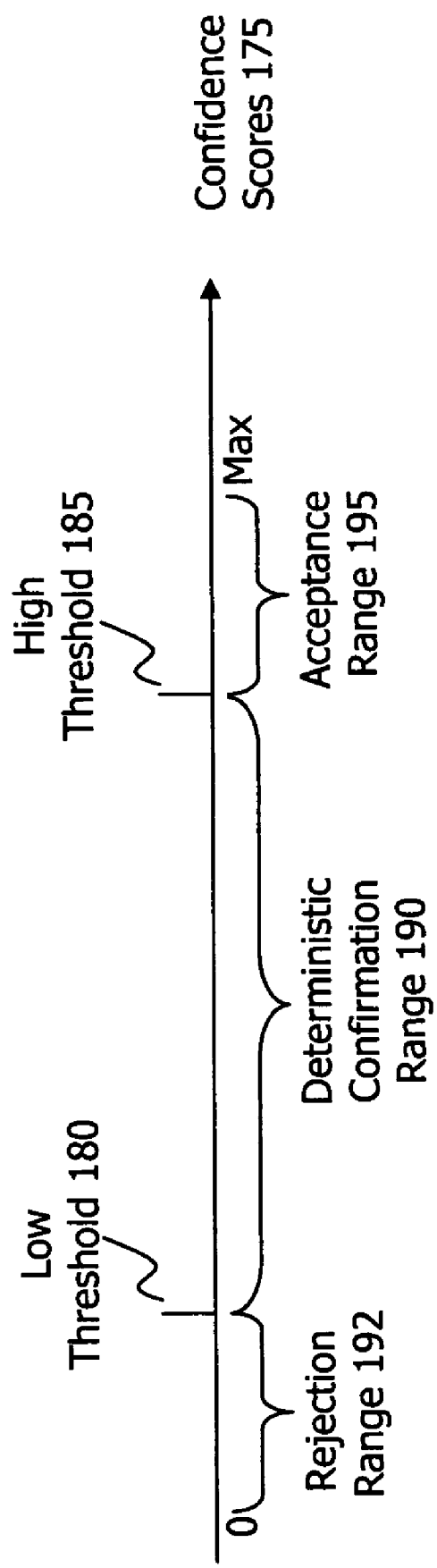
FIG. 1(b) (Prior Art) describes a conventional deterministic confirmation scheme.

In conventional confirmation systems, criteria used to make a confirmation decision usually rely on a deterministic confirmation scheme (as discussed with reference with FIG. 1(*a*) and FIG. 1(*b*)). In such schemes, a pre-determined range with respect to confidence scores may be specified. Such a predetermined range for confidence scores may be defined using both a low threshold confidence score, serving as a lower bound of the range, and a high threshold confidence score, serving as an upper bound of the range. If a confidence score falls within the range, a confirmation may be performed. Otherwise, no confirmation may be performed.

In the exemplary speech system 200, the confirmation decision mechanism 220 is capable of making a confirmation decision including making a random confirmation decision. Specific confirmation decision made at a particular moment may be determined according to the configuration of the system. To support a random mode enabled confirmation scheme, the confirmation decision mechanism 220 comprises a random confirmation determiner 225 and a confirmation determiner 230. The random confirmation determiner 225 may be responsible for making a random confirmation decision. The confirmation determiner 230 may be responsible for making either a deterministic confirmation decision or combine, for instance, a deterministic confirmation decision with a random confirmation decision to reach an integrated confirmation decision.

A confirmation process may end when the speech result is either affirmed or disaffirmed. In the former case, the speech system 200, at the end of the confirmation session, may have an adequately confident result. In the latter case, the speech system 200 may also have an adequately confident knowledge that the user's speech is not recognized.

In some applications such as automatic routing or call center, the speech system 200 may also optionally include the routing mechanism 255 that may route a call placed by the user 205 based on a speech recognition result. Depending on whether the speech from the user 205 during the call is recognized well, affirmed, or disaffirmed, the confirmation decision mechanism 220 may activate the routing mechanism 255 with information indicating such status regarding the speech recognition result so that the routing mechanism 255 may accordingly perform the routing. The routing mechanism 255, upon being activated, may route to an inquiry to, for example, a human operator 265 when the confidence score is low or an automatic response mechanism 260 if the confidence score of the speech recognition result is high.

For example, if the user 205 makes an inquiry about his billing statement and a speech recognition result on speech "billing" is confirmed, the routing mechanism 255 may route the underlying call to an automatic response mechanism 260 which, for example, may further generate an interactive response in the context of recognizing that the user 205 said "billing". Such a response may correspond to a further inquiry "Would you please specify the year and month of the bill concerned?" When the user 205 answers the questions related to the year and the month (also assuming that the answers are recognized or confirmed), the automatic response mechanism 260 may further retrieve the billing statement related to the user 205 within the time frame specified. To automatically respond to the user's inquiry, the automatic response mechanism 260 may also construct a text reciting detailed billing information and send such billing information to the text to speech mechanism 250 so that the billing statement content may be automatically played back to the user.

On the other hand, if the user's speech is not recognized or a speech recognition result from the user's speech is not confirmed, the routing mechanism 255, upon receiving information from the confirmation decision mechanism 220 indicating such, the routing mechanism 255 may route the call to a human operator 265 so that future interactions with the user 205 may be conducted through the human operator 265.

FIG. 2(*b*) depicts a different exemplary speech system 280 in which the confirmation mechanism 220 that permits a random confirmation conducts a confirmation through a human operator 270, according to at least one embodiment of the present invention. Compared with the exemplary speech system 200 wherein a confirmation operation is conducted via an automated means, in this embodiment, the confirmation operation is performed by a human operator 270.

In some embodiments, once a confirmation is activated, future interactions with the user 205 may be conducted through the human operator 270. At certain times, the human operator 270 may activate the routing mechanism 255 to connect the user 205 to appropriate destinations. For example, if the human operator 270 determines, during interaction with the user 205, that the user 205 has a question related to billing, the human operator 270 may activate the routing mechanism 255 to connect the user 205 to another human operator (265) who is, for example, specialized in answering billing questions. The human operator 270 may also activate the routing mechanism 255 in a way that the routing mechanism 255 may route the inquiry to the automatic response mechanism 260. This may occur when the human operator 270 gathers all relevant information related to the inquiry (e.g., year, month associated with the billing statement that the user 205 asked about) that is adequate to enable the automatic response mechanism 260 to retrieve the requested billing statement, automatically generates an output waveform based on the retrieved billing information, and plays back audio of the content of the billing statement.

Figure 3:
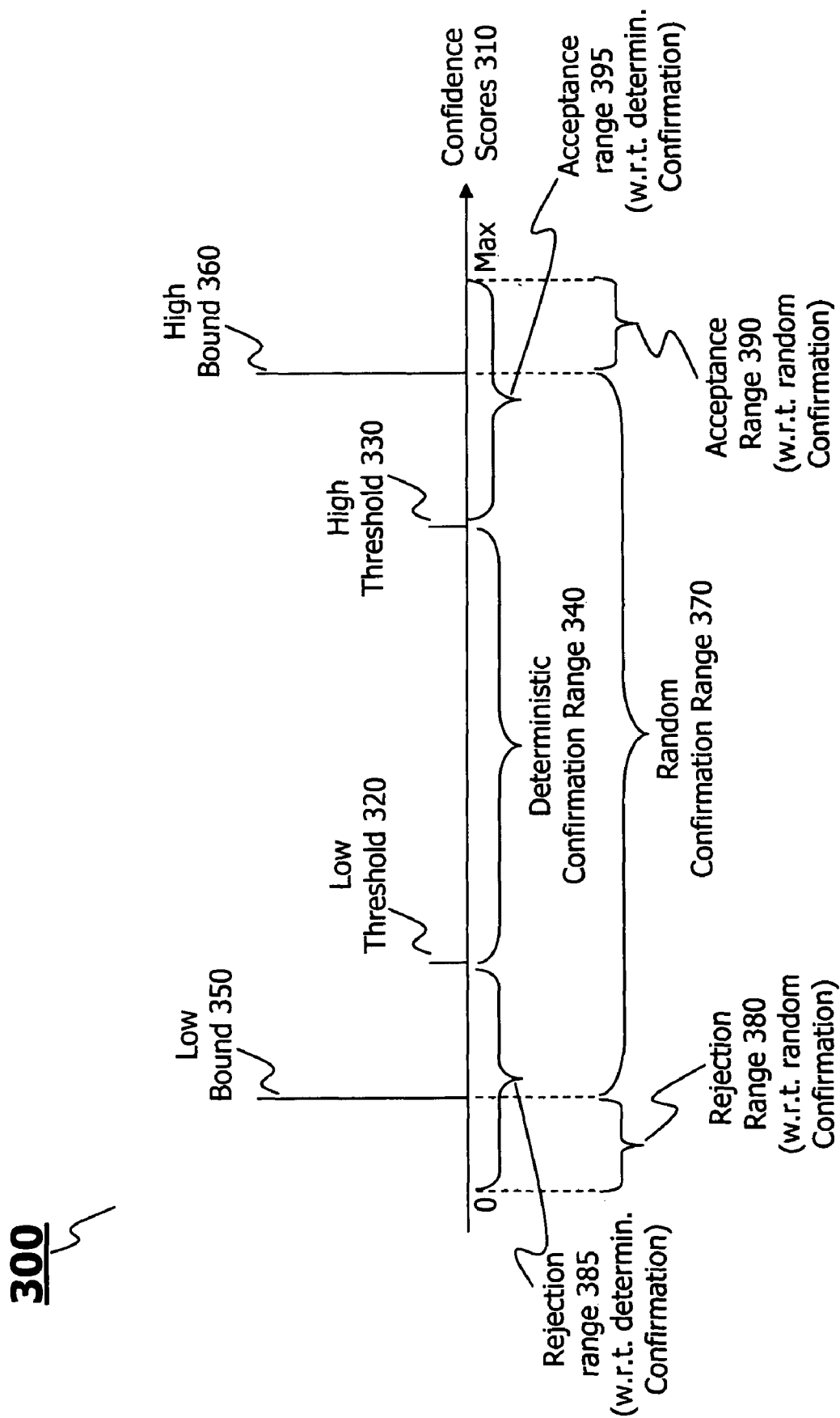
FIG. 3 describes an exemplary random confirmation scheme, according to at least one embodiment of the present invention.
Figure 4:
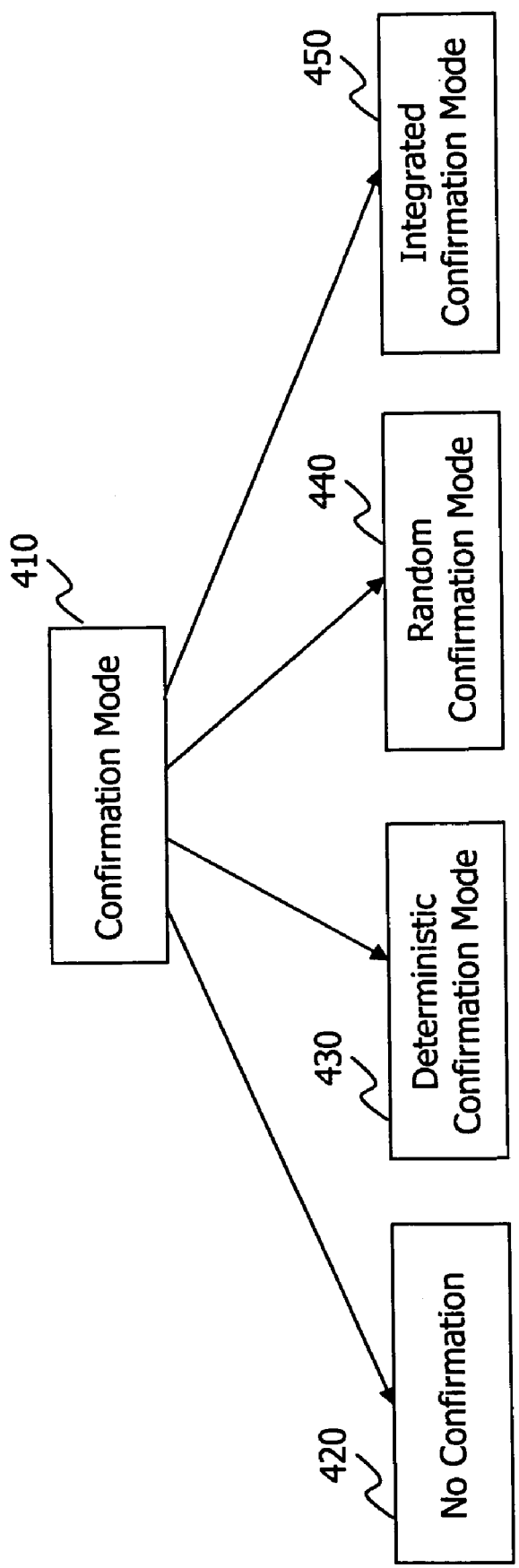
FIG. 4 depicts an exemplary internal functional diagram of a confirmation mechanism capable of performing confirmation in one or more modes, according to at least one embodiment of the present invention.

FIG. 3 describes an exemplary confirmation scheme 300, in which confirmation operations may be performed in different modes, according to at least one embodiment of the present invention. The X-axis in FIG. 3 represents confidence score values. Along the X-axis, a confidence score may have a valid value ranging from zero to a maximum (or max) value. This range represents a scope for all valid confidence scores. Within this scope of confidence scores, different confirmation modes may be defined. FIG. 4 illustrates exemplary types of configurable confirmation modes, according to at least one embodiment of the present invention. A confirmation mode 410 may include a mode 420 configured to indicate that no confirmation is to be performed, a deterministic confirmation mode 430, a random confirmation mode 440, and an integrated confirmation mode 450. Each of the illustrated confirmation modes and their relationships are described below.

Within the boundary defined as [0, max], there may be additional ranges defined: one corresponding to a random confirmation range 370 and the other corresponding to a deterministic confirmation range 340. The deterministic confirmation range 340 corresponds to the deterministic confirmation mode 430. The random confirmation range 370 corresponds to the random confirmation mode 440. The random confirmation range 370 may be specified by a low bound 350 and a high bound 360. A low threshold 320 and a high threshold 330 may specify the deterministic confirmation range 340. The deterministic confirmation range 340 may define a scope within which a confirmation is to be performed. The random confirmation range 370 may define a scope within which random confirmation decision is considered.

The deterministic confirmation range 340 and the random confirmation range 370 may be used independently of each other. For example, a speech system (e.g., 200 or 280) may be configured to perform confirmation in either a deterministic confirmation mode or a random confirmation mode but not both. When a speech system with a confirmation mechanism (e.g., 200 or 280) is configured to operate in a deterministic confirmation mode, a deterministic confirmation decision may be made according to the deterministic confirmation range 340. When a speech system with a deterministic confirmation mode, a speech recognition with a confirmation mechanism (e.g., 200 or 280) is configured to operate in a random confirmation mode, a random confirmation decision may be made according to the random confirmation range 370.

With a deterministic confirmation mode, a speech recognition result with a confidence score lower than the low threshold 320 may be rejected and a speech recognition result with a confidence score higher than the high threshold 330 may be accepted. That is, under a deterministic confirmation mode, the rejection range (385) corresponds to [0, low threshold 320] and the acceptance range (395) corresponds to [high threshold 330, max]. With a random confirmation mode, a speech recognition result with a confidence score lower than the low bound 350 may not be considered for a random confirmation decision and a speech recognition result with a confidence score higher than the high bound 360 may be accepted. That is, under a random confirmation mode, the rejection range (380) corresponds to [0, low bound 350] and the acceptance range (390) corresponds to [high bound 360, max].

There may be degenerate settings for different confirmation modes depending on specific values set for the low bound 350, the high bound 360, the low threshold 320, and the high threshold 330. In a random confirmation mode, when the low bound 350 is set to be zero, any speech recognition result that has a confidence score lower than the high bound 360 may be considered for random confirmation. When the high bound 360 is set equal to the value of max, a speech recognition result that has a confidence score higher or equal to the value of low bound 350 is to be considered for the possibility of performing a random confirmation. When the low bound 350 is set to be zero and the high bound is set to be max, any speech recognition result, no matter what its confidence score is, is to be considered for a random confirmation. When a speech recognition result is subject to the consideration of a random confirmation, whether a confirmation will be actually carried out may further depend on other criteria, which will be discussed below.

Similarly, in a deterministic confirmation mode, when the low threshold 320 is set to be zero, any speech recognition result that has a confidence score lower than the high threshold 330 may need to be confirmed. When the high threshold 330 is set equal to the value of max, a speech recognition result that has a confidence score higher or equal to the value of the low threshold 320 is to be confirmed. When the low threshold 320 is set to equal to the high threshold 330, effectively, there is no deterministic confirmation. Similarly, when the low bound 350 is set to be equal to the high bound 360, effectively there may be no random confirmation to be performed. If all such values (the low and high thresholds 320 and 330 as well as the low and high bound 350 and 360) are set equal, it may effectively create a no confirmation mode (420). When both the low threshold 320 is set to be zero and the high threshold 330 is set to be max, any speech recognition result, no matter what its confidence score is, is to be confirmed. In practice, since the amount of confirmation may be restricted to a certain rate considered not to be too burdensome to the user 205, some degenerate cases mentioned above may be avoided. However, in some applications, a higher rate of confirmation may be desirable.

In some embodiments, the deterministic confirmation mode and the random confirmation mode may be combined so that a confirmation mechanism may be operated in an integrated confirmation mode. There may be different means to integrate the two confirmation modes. For example, the deterministic confirmation range 340 may be defined as within the random confirmation range 370 (as shown in FIG. 3). An integrated confirmation mode may be configured so that if a confidence score that is within the deterministic confirmation range 340 is to be confirmed and if the confidence score is outside of the deterministic confirmation range 340 but within the random confirmation range 370 it may be considered for a random confirmation.

Alternatively, an integrated confirmation mode may also be configured so that a random confirmation consideration may take priority over a deterministic confirmation decision. For example, if a confidence score is higher than or equal to the low bound 350, a random confirmation decision may be made. If the random confirmation decision is negative (i.e., not to perform a random confirmation), a deterministic confirmation decision may then be made. The opposite configuration is also possible.

In other embodiments, a random confirmation decision may be made jointly with a deterministic confirmation. In this case, the two decisions may be combined in some fashion to reach an integrated decision. For instance, a logical OR operation may be performed between the two decisions. That is, if one of the decisions is to conduct a confirmation, the integrated confirmation decision is to conduct a confirmation. Alternatively, a logical AND operation may be performed so that only when both the deterministic confirmation decision and the random decision are to conduct a confirmation, will the integrated confirmation decision allow a confirmation to go forward. Other forms of integrating a deterministic and a random confirmation decision may also be realized. The determination of how to combine such decisions may depend on application needs.

Figure 5:
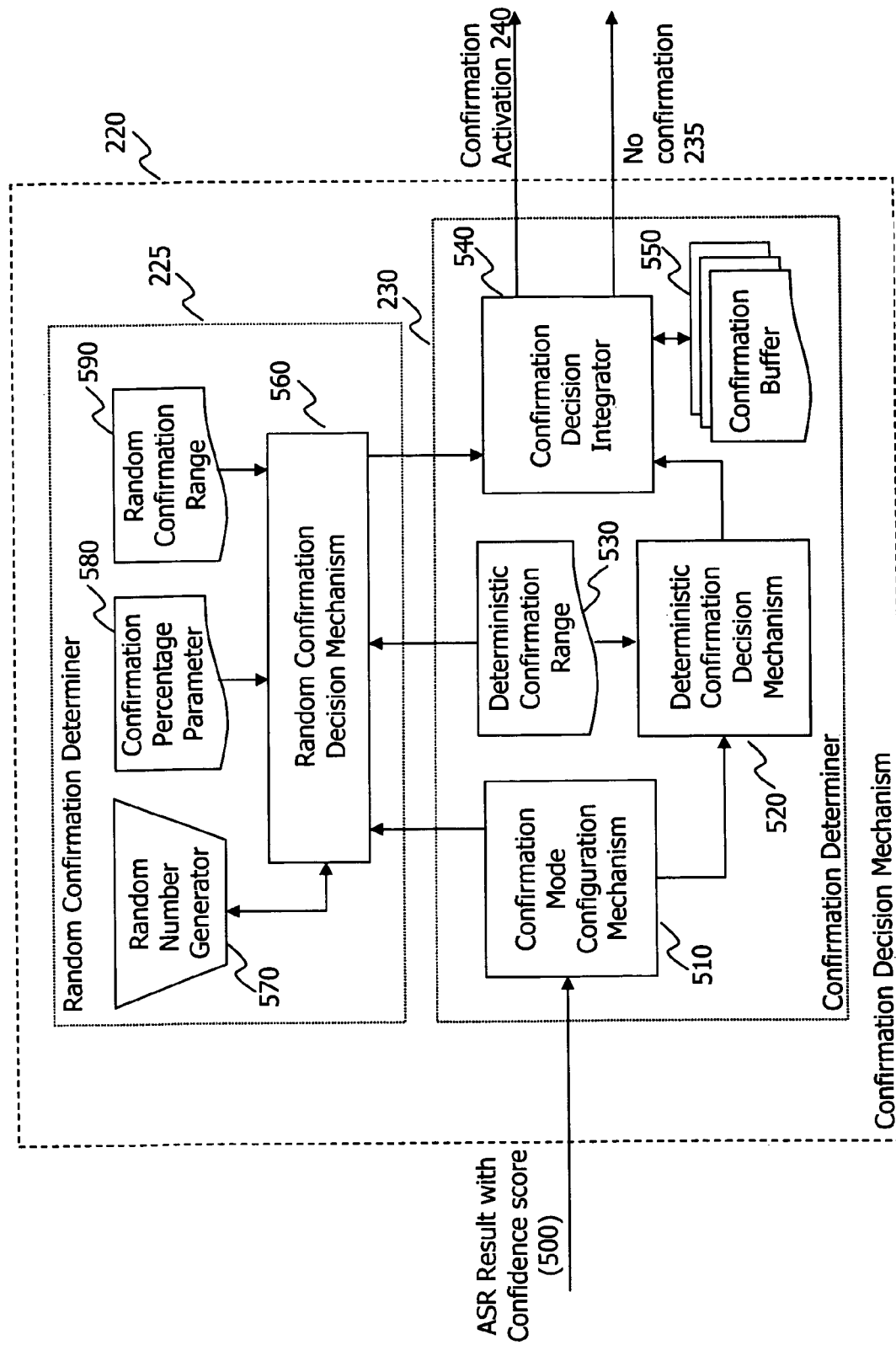
FIG. 5 illustrates exemplary types of configurable confirmation modes, according to at least one embodiment of the present invention.

FIG. 5 depicts an exemplary internal functional diagram of the confirmation decision mechanism 220, according to at least one embodiment of the present invention. As described earlier, the random confirmation determiner 225 within the confirmation decision mechanism 220 may be responsible for making a random confirmation decision while the confirmation determiner 230 may be responsible for making either a deterministic confirmation decision or an integrated confirmation decision.

The confirmation determiner 230 further comprises a confirmation mode configuration mechanism 510, a deterministic confirmation decision mechanism 520 that makes a deterministic confirmation decision based on a deterministic confirmation range 530, and a confirmation decision integrator 540.

The confirmation mode configuration mechanism 510 may support configuration of a confirmation mode and direct the confirmation operation according to the confirmation mode configuration. For instance, if a random confirmation mode is configured, when the confirmation mode configuration mechanism 510 receives an automatic speech recognition result with a confidence score (500), it may direct or invoke the random confirmation determiner 225 to make a random confirmation decision. When the configuration is an integrated confirmation mode, the confirmation mode configuration mechanism 510 may activate both the random confirmation determiner 225 and the deterministic confirmation decision mechanism 520.

When the deterministic confirmation decision mechanism 520 is activated (e.g., when the confirmation decision mechanism 220 is configured to perform a confirmation operation in either a deterministic confirmation mode or in an integrated mode), it may access the pre-defined deterministic confirmation range 530. As discussed earlier, such a range may be defined with respect to a confidence score. A deterministic confirmation decision may then be made using the input confidence score of the current speech recognition result (500) based on the deterministic confirmation range 530.

The deterministic confirmation decision made by the deterministic confirmation decision mechanism 520 is then forwarded to the confirmation decision integrator 540. The confirmation decision integrator 540 may combine a deterministic confirmation decision with a random confirmation decision. This may occur when the confirmation decision mechanism is configured to operate in an integrated confirmation mode. When the confirmation mode is not configured as an integrated confirmation mode, the confirmation decision integrator 540 may serve simply as a path. For instance, when the configured confirmation mode is a deterministic confirmation mode, the confirmation decision integrator 540 may simply pass a deterministic confirmation decision made by the deterministic confirmation decision mechanism 520. If the deterministic confirmation decision is positive (i.e., a confirmation is to be performed), the confirmation decision integrator 540 may generate a confirmation activation signal (240) to initiate a confirmation operation. If the deterministic confirmation decision is negative (i.e., no confirmation is to be carried out), the confirmation decision integrator 540 may generate a signal (235) indicating that no confirmation is to be performed. Such a signal may be used to activate the routing mechanism 255 to perform routing based on the speech recognition result (500).

There may be different situations in which a no confirmation decision 235 may be made. For example, when the confidence score is too low, there may be no point to make a confirmation. This may correspond to a rejection situation. Alternatively, when the confidence score is very high, there may be no need to confirm. This may correspond to an acceptance scenario. In the former case, the routing mechanism 255 may route the inquiry to a human agent 265. In the latter case, the routing mechanism 255 may route the inquiry to an automatic response generation mechanism 260.

When a confirmation is to be performed, the confirmation decision integrator 540 may also store the speech content to be confirmed in a confirmation buffer 550. For instance, if speech recognition result "billing" is to be confirmed, the speech recognition result "billing" may be stored in the confirmation buffer 550 as the content to be confirmed. Storing the confirmation content before each confirmation operation may be useful or even necessary. This may be especially true when the corresponding confirmation result (e.g., either confirm that what was said is or is not "billing") will be used for various purposes.

The confirmation content may be stored with different kinds of relevant information. For example, the confidence score associated with a recognition result (e.g., billing) may also be stored. In addition, the waveform of the user's utterance may also be stored (or indexed) with the confirmation content. The outcome of each confirmation operation may also be stored with the confirmation content. To link a confirmation result with a particular confirmation content that is already stored in the confirmation buffer 550, an appropriate index or identification scheme may be employed. Such stored confirmation results with relevant information associated with the corresponding confirmation content may provide a basis for data collection for self-monitoring and adaptation purposes. Further details related to dynamic data collection and self-tuning based on such dynamically collected data are discussed with reference to FIGS. 8-9.

To support random confirmation decision making, the random confirmation determiner 225, in some embodiments, comprises a random number generator 570, storage for recording a configurable random confirmation range 590, storage for recording a configurable confirmation percentage parameter 580, and a random confirmation decision mechanism 560. The random confirmation decision mechanism 560 may be invoked or directed to make a random confirmation decision when the confirmation decision mechanism 220 is configured to operate in either a random confirmation mode or an integrated mode. Upon being activated, the random confirmation decision mechanism 560 may check first to see whether the confidence score associated with the speech recognition result 500 is within the random confirmation range (590).

If the confidence score is within the random confirmation range 590, the random confirmation decision mechanism 560 may further make a random decision in terms of whether a confirmation is to be carried out. In one embodiment, such a random confirmation decision may be made based on the value of a random number generated by the random number generator 570, which may be configured to generate a random number within a pre-determined range. In some embodiments, such a pre-determined range for a random number may correspond to [0.0, 100.0]. The value of the generated random number may then be compared with the confirmation percentage parameter 580 to determine whether a confirmation is to be performed.

In some embodiments, the confirmation percentage parameter 580 may specify a value between 0 and 100, representing a percentage indicating that no more random confirmation than this upper bound percentage is to be carried out. That is, the confirmation percentage parameter 580 may be used to control how often a random confirmation is to be performed. In some applications, such a percentage may need to be kept relatively low but in other applications a higher percentage may be allowed.

A random number generated by the random number generator 570 within the range of [0.0, 100.0] may be compared directly with the confirmation percentage number 580 to control the percentage of the random confirmation to be carried out. For example, if the confirmation percentage parameter 580 is 25, it indicates that a random confirmation may not be carried out more than 25 percent of time. Statistically, the random number generator 570 may generate a random number smaller than or equal to 25 about 25 percent of the time. Therefore, the generated random number may be compared directly with the confirmation percentage parameter 580 to determine whether to perform random confirmation. If it does not exceed the confirmation percentage parameter 580, the random confirmation decision mechanism 560 may decide to carry out a confirmation on the speech recognition result. Otherwise, the random confirmation decision mechanism 560 may decide that there will be no confirmation.

The random confirmation decision generated by the random confirmation decision mechanism 560 may then be forwarded to the confirmation decision integrator 540 where the random confirmation decision may simply be accepted (e.g., in a random confirmation mode) or integrated with a deterministic confirmation decision from the deterministic confirmation decision mechanism 520 (e.g., in a deterministic confirmation mode).

As discussed earlier, there may be different ways to integrate a deterministic and a random confirmation decisions to derive an integrated confirmation decision. The confirmation decision integrator 540 may be implemented to achieve one or more integration methods with reconfigurable capabilities. In this way, the integration scheme may be changed to adapt to application needs.

Figure 6:
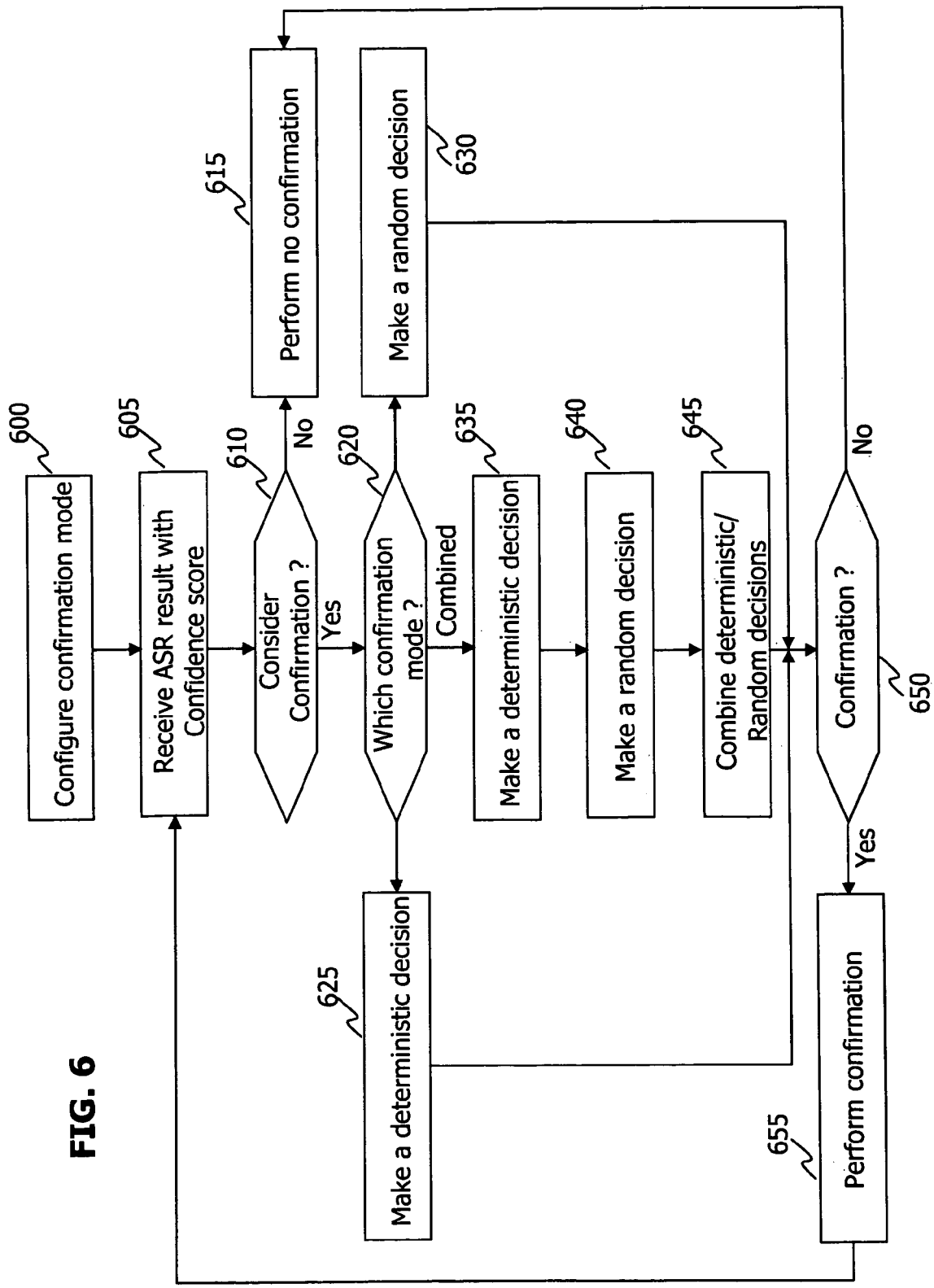
FIG. 6 is a flowchart of an exemplary process, in which a confirmation mechanism performs a confirmation based on a confirmation decision, according to at least one embodiment of the present invention.

FIG. 6 is a flowchart of an exemplary process, in which a confirmation mechanism makes a confirmation decision based on different confirmation modes, according to at least one embodiment of the present invention. The confirmation mode is first configured at 600. When a speech recognition result is received, at 605, with an associated confidence score, it is determined, at 610, whether the confirmation mode corresponds to a "no confirmation" mode (see FIG. 4). If so, the confirmation mechanism makes a decision, at 615, to perform no confirmation.

If the configured confirmation mode does not correspond to a "no confirmation" mode, the confirmation mechanism further determines, at 620, whether the configured confirmation mode corresponds to a deterministic confirmation mode, a random confirmation mode, or an integrated confirmation mode. If it is a deterministic confirmation mode, the confirmation mechanism makes, at 625, a deterministic confirmation decision. If the deterministic confirmation decision is to perform a confirmation, determined a 650, a confirmation is carried out at 655. Otherwise, there is no confirmation to be performed. Similarly, when it is a random confirmation mode, the confirmation decision mechanism makes a random confirmation decision at 630. If the decision is to carry out a confirmation, determined at 650, the confirmation is carried out at 655. Otherwise, no confirmation is performed.

Figure 7A:
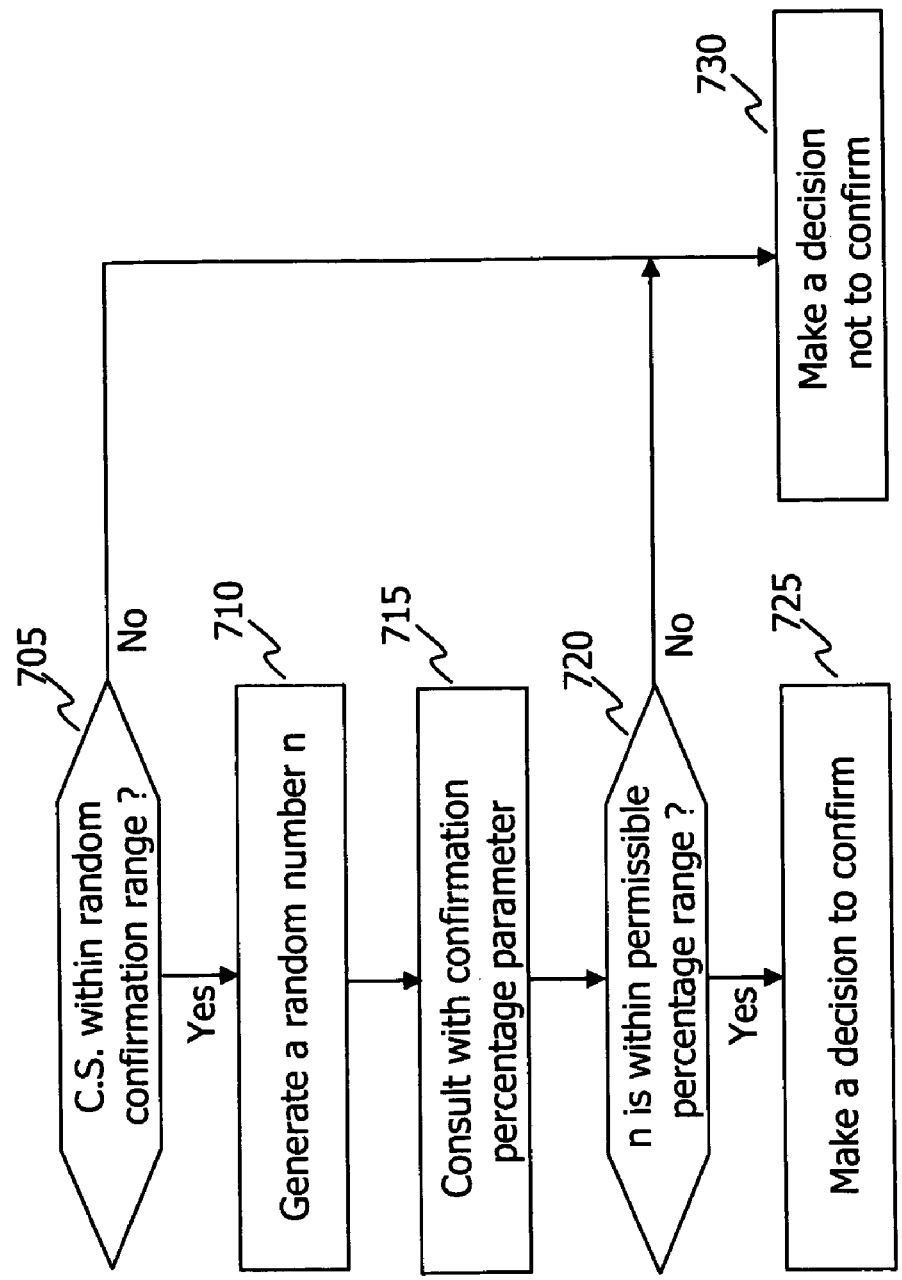
FIG. 7 is a flowchart of an exemplary process, in which a random confirmation decision is made based on certain criteria, according to at least one embodiment of the present invention.
Figure 7B:
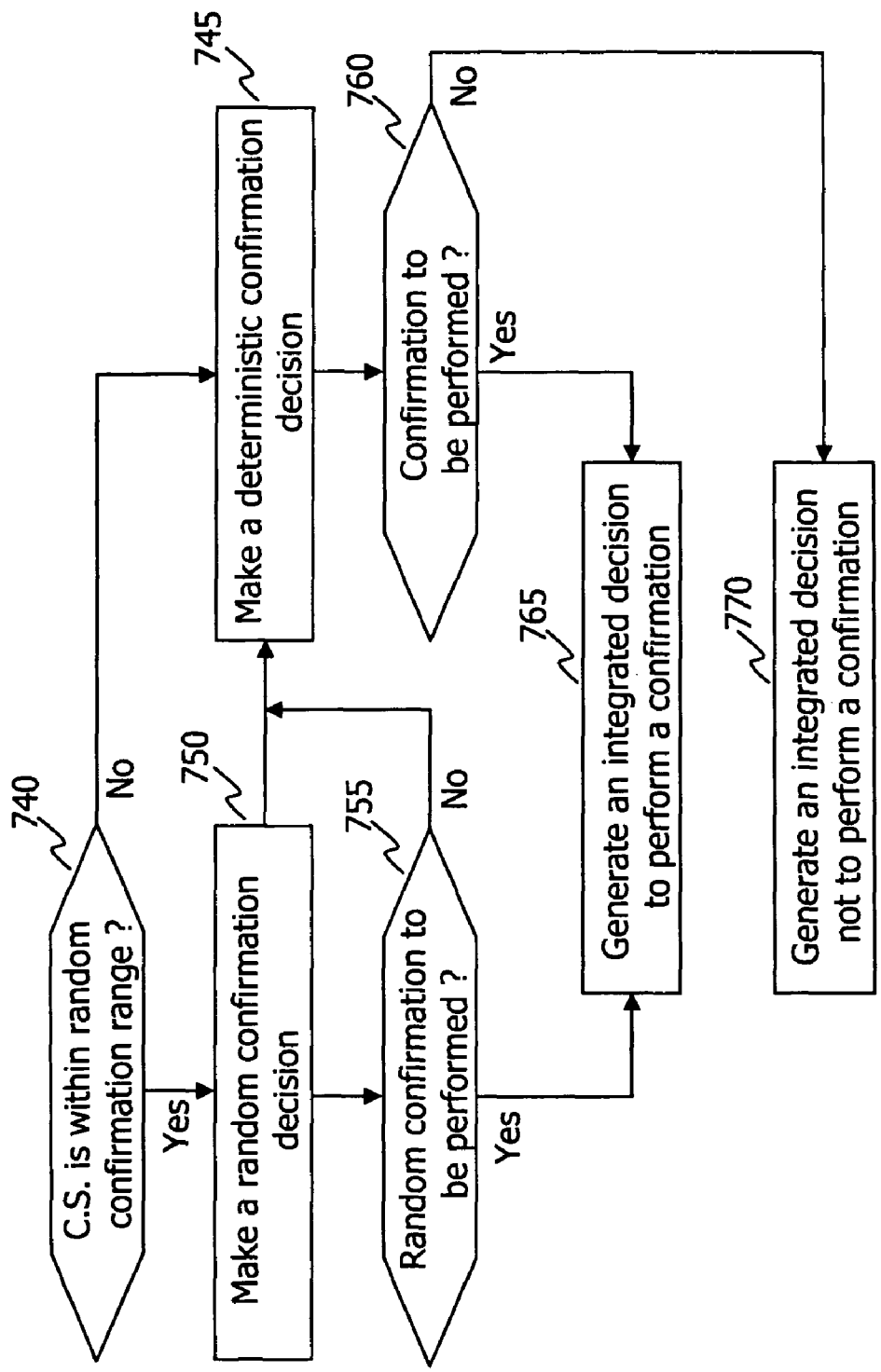

An exemplary detailed process for making a random confirmation decision is described in FIG. 7(*a*), according to at least one embodiment of the present invention. It may first be determined, at 705, whether the confidence score associated with current speech recognition result is within the random confirmation range. As discussed earlier, this random confirmation range may be specified based on a low bound and a high bound. If the confidence score falls within such defined random confirmation range, a random number n is generated, at 710, within a random number range (e.g., [0.0, 100.0]). To determine whether a confirmation is to be carried out, a confirmation percentage parameter is consulted at 715. If the generated random number n is within the permissible confirmation percentage, determined at 720, a positive confirmation decision is made, at 725, to carry out a confirmation on the underlying speech recognition result. If the generated random number n is not within the permissible confirmation percentage range, a negative confirmation decision is made, at 730, not to carry out a confirmation.

Referring to FIG. 6, when the confirmation mode corresponds to an integrated mode, determined at 620, the confirmation decision mechanism may generate a deterministic and/or a random confirmation decision and may then combine them to reach an integrated decision. The deterministic confirmation decision and the random confirmation decision may be made independent of each other before the integration. These two decisions may also be made in an interrelated manner (detailed discussion related to this is given with reference to FIG. 7(*b*)).

In some embodiments, the confirmation decision mechanism may make a deterministic decision at 635. Then a random confirmation decision is also made at 640. These two decisions may or may not be independent of each other and may not be carried out in the sequence illustrated. The deterministic and random confirmation decisions are then combined at 645. The integration method used may be pre-configured as, but not limited to, one of the approaches mentioned earlier. Other integration schemes may also be employed to fit application needs. If the combined decision is to carry out a confirmation, the confirmation is performed at 655. Otherwise, no confirmation is carried out.

FIG. 7(*b*) is a flowchart of an exemplary process, which illustrates one embodiment of reaching an integrated confirmation decision, according to the present invention. In this embodiment, random confirmation decision is considered first. If the confidence score associated with the current speech recognition result is within the random confirmation range (e.g., 370), determined at 740, a random confirmation decision is made at 750 (e.g., according to the process described in FIG. 7(*a*)). If a positive random confirmation decision is made (i.e., to carry out a confirmation), determined at 755, a positive integrated confirmation decision is generated at 765.

If a negative random confirmation decision is made (i.e., no random confirmation is to be carried out), a deterministic confirmation decision is made at 745. If the deterministic confirmation decision is positive (i.e., to carry out a confirmation), determined at 760, a positive integrated confirmation decision is generated at 765. Otherwise, a negative integrated confirmation decision is generated at 770.

If the confidence score associated with the speech recognition result is not within the random confirmation range, determined at 740, a deterministic confirmation decision is made at 745. If the deterministic confirmation decision is positive (i.e., to carry out a confirmation), determined at 760, a positive integrated confirmation decision is generated at 765. Otherwise, a negative integrated confirmation decision is generated at 770.

The integration scheme illustrated in FIG. 7(*b*) may behave in a manner similar to a logical OR operation between a random confirmation decision and a deterministic confirmation decision with the random confirmation decision being considered first (i.e., takes a higher processing priority). There may be no confirmation only when both the random confirmation decision and the deterministic confirmation decision are negative. It should be appreciated by one skilled in the art that other schemes of integration may also be employed. The choice of a particular approach may be related to different factors, including but not limited to application needs, performance consideration, or design decisions.

Figure 8:
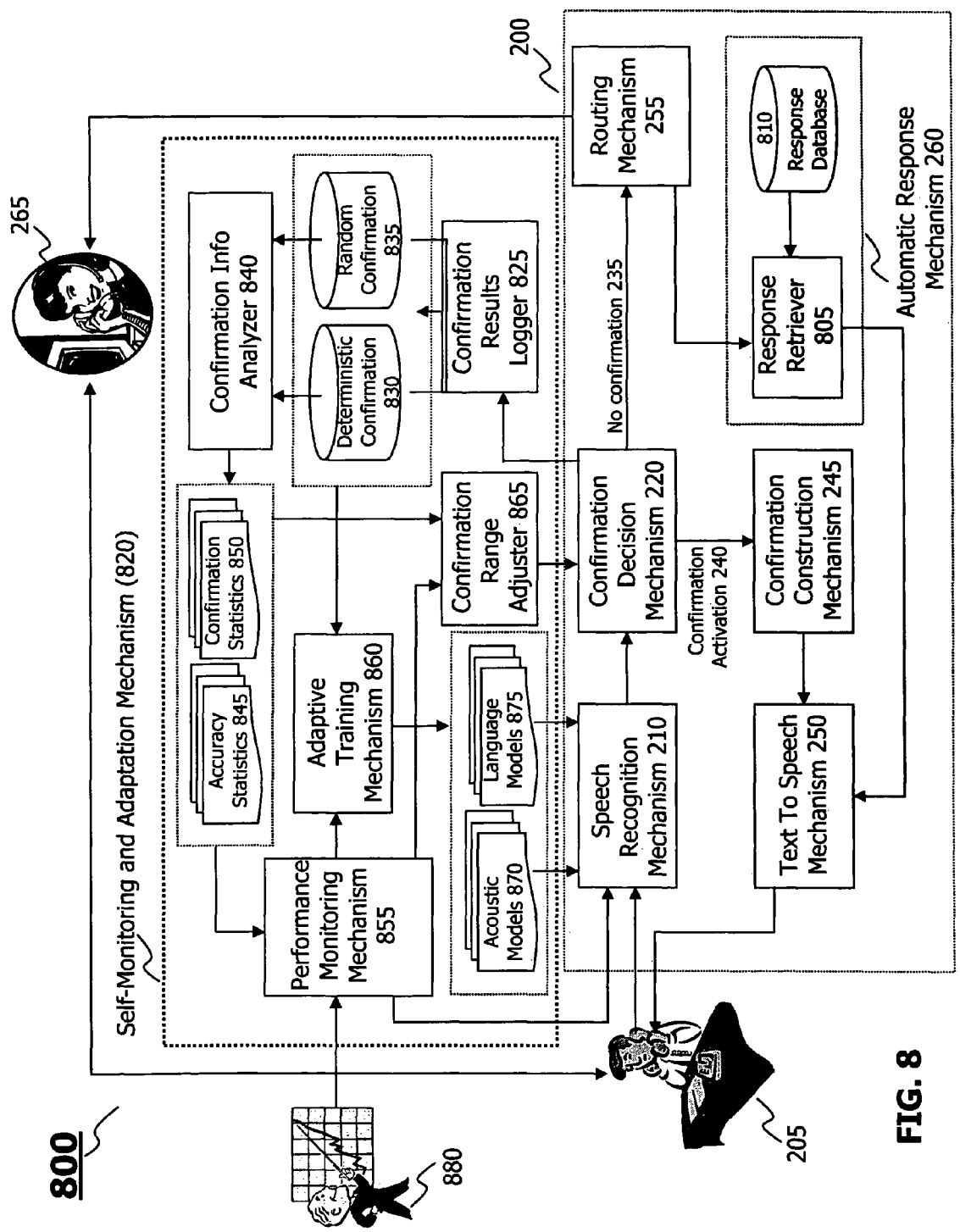
FIG. 8 depicts a confirmation mechanism with a self monitoring and adaptation mechanism, according to at least one embodiment of the present invention.

FIG. 8 depicts a self-tuning speech system 800 with a self monitoring and adaptation mechanism, according to at least one embodiment of the present invention. The self tuning speech system 800 is configured to utilize confirmation results to monitor the performance of the underlying speech system, to adaptively re-train the speech system when the performance data indicates a need, and also to dynamically adjust the confirmation strategy. The self-tuning speech system 800 comprises a speech system 200 and a self monitoring and adaptation mechanism 820. The speech system 200 is described earlier with reference to FIG. 2(*a*) and is capable of performing confirmation on automatic speech recognition results according to certain confirmation configurations. The speech system 200 is deployed in the self tuning speech system 800 to perform essential functions of speech recognition and confirmation. Such essential functions may also be performed by the alternative speech system 280, in place of the speech system 200, described earlier with reference to FIG. 2(*b*).

The speech system 200 (or 280) as illustrated comprises difference components as discussed above. The automatic response mechanism 260 in such a speech system is illustrated here to further include a response retriever 805 and a response database 810. For instance, in a call center application, when the routing mechanism 255 routes an inquiry (corresponding to a call) from the user 205, the response retriever 805 may retrieve a recorded answer to the inquiry from the response database 810. One example of such an inquiry may be for a billing statement corresponding to a specified period (e.g., March, 2003). The retrieved record (e.g., the billing details) may then be forwarded to the text to speech mechanism 250 so that the retrieved record may be played back to the user 205.

The self monitoring and adaptation mechanism 820 may perform other essential functions related to monitoring and feedback control in the self-tuning speech system 800. In the exemplary embodiment illustrated in FIG. 8, the self monitoring and adaptation mechanism 820 may comprise a confirmation result logger 825, a confirmation information analyzer 840, a performance monitoring mechanism 855, and a feedback control mechanism including, for example, an adaptive training mechanism 860, and a confirmation range adjuster 865. The confirmation results logger 825 may be responsible for recording confirmation results which may include, but not be limited to, information such as the underlying speech recognition result and its associated confidence score, the confirmation content (what is subject to confirmation), confirmation response (whether the speech recognition result is correct or not), or the waveform signals corresponding to the utterance of the speaker from which the speech recognition result is produced.

Each collected confirmation result may further include indicators in terms of whether the confirmation is performed under a deterministic or a random confirmation decision and/or whether the confidence score falls within a rejection range, an acceptance range, or in between with respect to a particular setting. Confirmation results produced under a deterministic confirmation mode may be stored separately from confirmation results produced under a random confirmation mode. In FIG. 8, two data storages, one for deterministic confirmation results 830 and the other for random confirmation results 835, may be provided. Certain relationships may exist between the data stored in the deterministic confirmation results storage 830 and the data stored in the random confirmation results storage 835.

Stored confirmation results may also be divided and/organized according to different criteria. For example, random confirmation results with underlying confidence scores falling within the rejection range but with a positive confirmation may be grouped together. Confirmation results with confidence scores falling within the acceptance range but with a negative confirmation may be grouped together. Since different pieces of information may be utilized for different purposes, they may be organized in a way that facilitates the underlying usages.

Some of the confirmation results may be used for performance monitoring purposes and some may be for self-tuning purposes. To facilitate different purposes, the confirmation information analyzer 840 may be configured to perform certain analyses on the confirmation results and produce various measures such as accuracy statistics 845 and confirmation statistics 850. The accuracy statistics 845 may include, for example, the percentage of the confirmed speech recognition results that have confidence scores within a rejection range, the percentage of the disconfirmed speech recognition results that have confidence scores within an acceptance range, etc. The confirmation statistics 850 may include, but not be limited to, the rate of positive confirmation with respect to confidence score ranges or the rate of disconfirmed results with respect to different confidence score regions. The determination of the statistics to be computed based on collected confirmation results may depend on factors such as application requirements, complexity of the computation, the required collection strategy, and the cost of collecting needed data.

To monitor the performance of the self-tuning speech system 800, an administrator 880 may access, through the performance monitoring mechanism 855, different statistics (e.g., computed by the confirmation information analyzer 840) to review the system performance. The performance monitoring mechanism 855 may be configured to provide a graphical user interface (GUI) including, but not limited to, a web enabled interface or a proprietary interface. The performance monitoring mechanism 855 may be configured to further provide other essential functionalities such as information display, information redisplay via sorting, and interaction with a user in terms of, for instance, information selection and display style determinations.

Through a GUI, the performance monitoring mechanism 855 may interact with the administrator 880 and assist the administrator 880 to access and organize information in a manner useful to monitor different aspects of the performance of the underlying speech system. Furthermore, the performance monitoring mechanism 855 may also provide options, through its interface, to the administrator 880 that allows the administrator 880 to select action items based on monitoring results displayed. For example, the performance monitoring mechanism 855 may provide buttons representing different feedback control operations, which the administrator 880 can click to select performance of appropriate feedback control/tuning operations. Further interfaces may also be provided to allow the administrator 880 to enter feedback control parameters.

In the illustrated embodiment, the feedback control operations provided by the self monitoring and adaptation mechanism 820 include adapting the speech recognition mechanism 210 based on confirmation results and dynamically adjusting confirmation ranges. To achieve the former, the adaptive training mechanism 860 may be responsible for re-training the speech recognition mechanism 210 to adapt the acoustic models 870 and/or language models 875 that are used in performing speech recognition.

The adaptive training mechanism 860 may be activated either manually by the administrator 880 manually via the performance monitoring mechanism 855 or automatically by the performance monitoring mechanism 855. Some conditions may be pre-determined to determine when to automatically trigger the adaptation. For instance, a threshold may be set up with respect to the expected rate of positive confirmation on speech recognition results with confidence scores within a rejection range. In this case, if there is a higher rate of confirmed speech recognition results with confidence scores within a rejection range, it may indicate that the acoustic model(s) related to the underlying word or phrase may not work well. This may happen when, for example, the acoustic models are derived based on training data with a different accent. In this case, the adaptive training mechanism may be activated to re-train the acoustic models. Alternatively, an appropriate mechanism (not shown) may be activated to adjust the threshold for accepting a speech recognition result (e.g., to lower the threshold).

When the adaptive training mechanism 860 is triggered, other relevant information may be forwarded. Such information may include the specific data to be used to re-train the system. For instance, such information may indicate what data the adaptive training mechanism 860 should use to re-train the system. Such data may correspond to a particular group of confirmation results (e.g., a group of confirmed speech recognition results that have confidence scores in the rejection range). The waveforms and the confirmed speech recognition results from a specified group of confirmation results may then be used to re-train the system.

The confirmation range adjuster 865 may be activated either manually by the administrator 880 through the performance monitoring mechanism 855 or automatically by the performance monitoring mechanism 855. The confirmation range adjuster 865 may be triggered if there is some monitoring result that may indicate that some confirmation parameters may not be appropriate. Certain criteria may be specified and used to determine when the confirmation range adjuster 865 is to be triggered automatically. For instance, if across all confirmation results, the confirmation rate (i.e., the percentage of the underlying speech recognition results that are confirmed as correct) for speech recognition results having a confidence score close to the low threshold of the deterministic confirmation range is high, it may indicate that the low threshold of the deterministic confirmation range may need to be adjusted to a lower value.

The confirmation range adjuster 865 may, upon being activated, determine how the confirmation range is to be adjusted. Such a determination may be made based on the conditions under which the confirmation range adjuster 865 is invoked. Under some conditions, the lower threshold may need to be adjusted to a lower value or a higher value. In this case, adjusting the low threshold to a lower value will allow more speech recognition results to be confirmed. Making the low threshold higher may reduce the number of confirmations and may also reject more results.

Under other conditions, the high threshold of a confirmation range may need to be adjusted to a different value. Adjusting the high threshold to a higher value may allow more confirmations to be performed. Making the high threshold lower may reduce the number of confirmations. Whether applying adjustment to a low threshold or a high threshold may be determined based on the monitored results. Similarly, the direction of the adjustment (i.e., increase or decrease a threshold value) may also be determined according to the monitored results. The adjustment amount may be determined based on some specific rules or according to some pre-defined formulae. For example, a simple rule may be that each adjustment corresponds to a fixed amount.

In some embodiments, the computation of confidence scores associated with speech recognition results may also be adjusted (the corresponding mechanism is not shown in FIG. 8) based on monitoring results. For example, if monitoring results indicate that the confidence scores seem to signal a higher level of confidence than the confirmation results suggest, the way the confidence scores are computed may be adjusted so that lower confidence scores that are more consistent with confirmation results may be generated. The adjustment may be made to certain parameters used in computing the confidence scores.

There may be other self-tuning measures that use the collected confirmation results. A particular implementation of the self-monitoring and adaptation mechanism 820 may realize some specific tuning capabilities based on confirmation results collected to facilitate the tuning capabilities.

Figure 9:
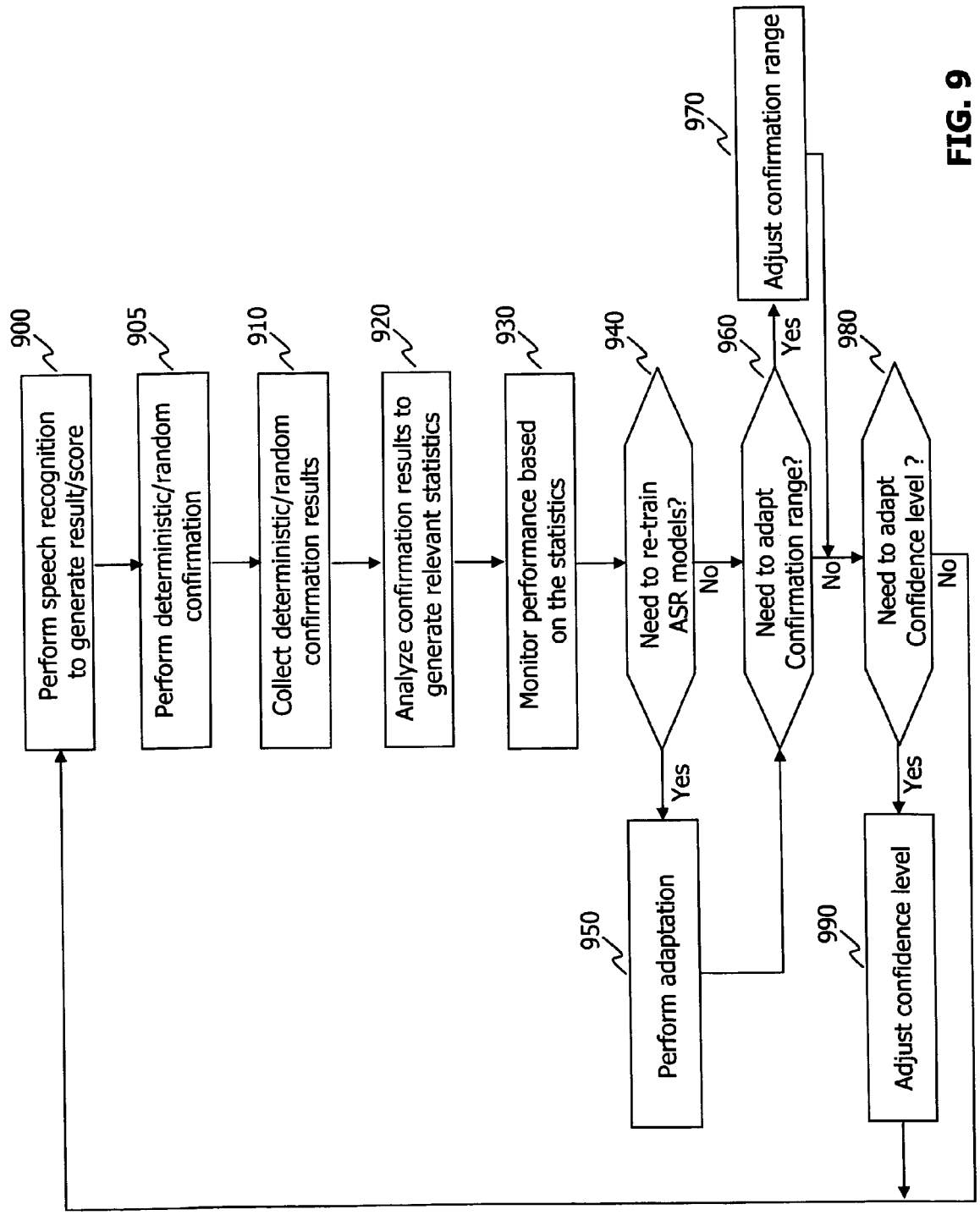
FIG. 9 is a flowchart of an exemplary process, in which confirmation results are collected and used to monitor and adapt performance, according to at least one embodiment of the present invention.

FIG. 9 is a flowchart of an exemplary process, in which the self tuning speech system 800 utilizes confirmation results collected to monitor and adapt its performance, according to at least one embodiment of the present invention. Speech recognition is performed at 900 to produce a speech recognition result with an associated confidence score. A confirmation decision is made at 905 based on the speech recognition result and the confidence score. The process of making the confirmation decision and carrying out the decision is described earlier with reference to FIGS. 6, 7(a), and 7(b).

If a confirmation is performed, the confirmation result is collected at 910. The collected confirmation results are analyzed at 920 to produce various relevant statistics and measures. Using such statistics and measures, the system performance is monitored at 930. Based on the monitoring results, it is determined whether any self tuning operation may need to be performed.

If the monitoring results suggest adapting the speech recognition mechanism, determined at 940, adaptive re-training may be performed at 950. This may include retrieving adaptive training data corresponding to a specific group of confirmation results and using the retrieved training data to re-train the acoustic models or the language models used for speech recognition.

If the monitoring results suggest an adjustment be made to the confirmation range, determined at 960, the confirmation range adjuster performs the adjustment at 970. This may include determining which confirmation range parameter needs to be changed, the direction of the change, as well as the amount of the adjustment to be made.

If the monitoring results suggest an adjustment be made to the computation of a confidence score, determined at 980, the confidence level computed for each speech recognition result may be accordingly changed at 990. This may include identifying the parameters to which adjustment is to be made, the direction of the change (positive or negative), as well as the amount of the adjustment to be made.

Figure 10:
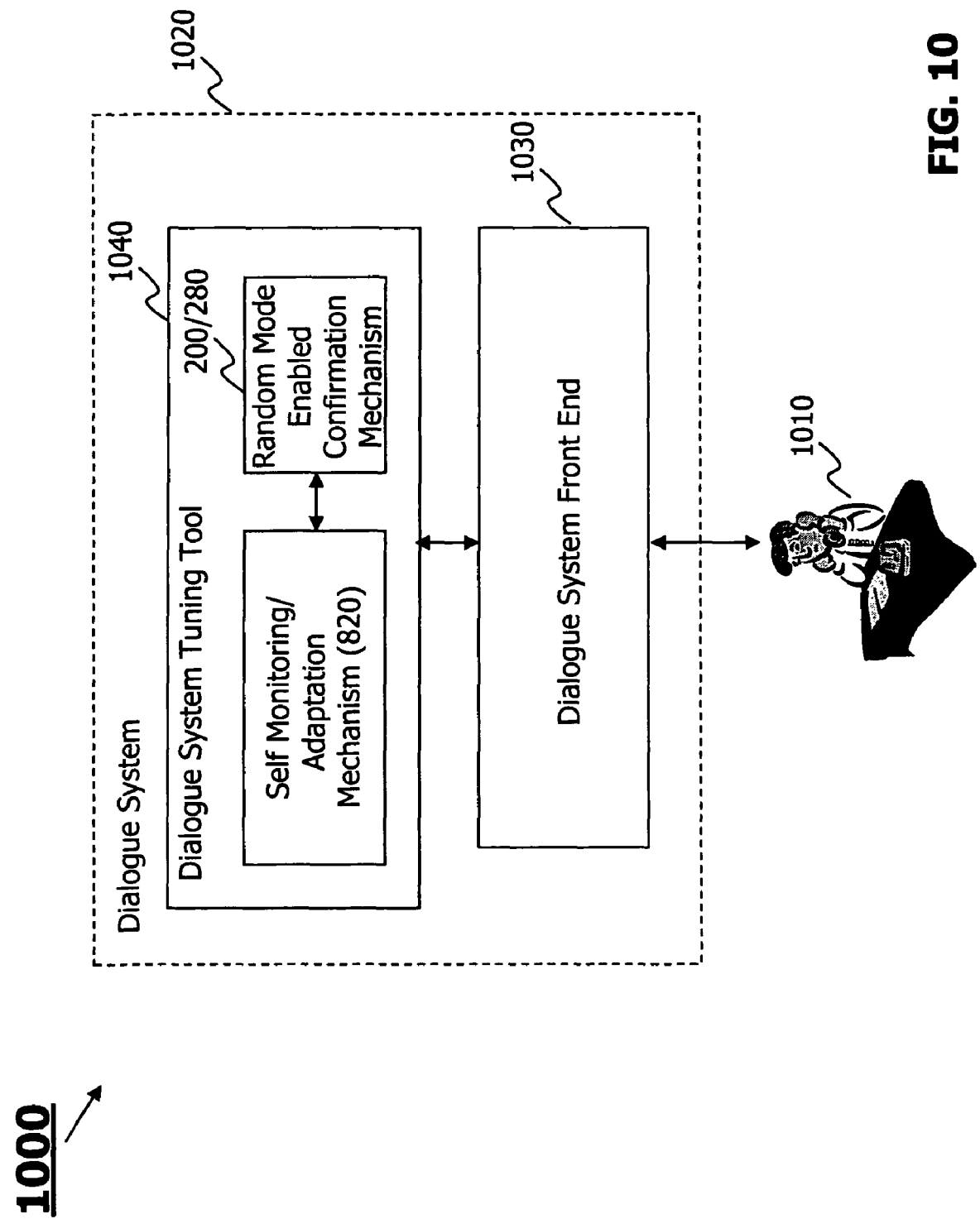
FIG. 10 depicts an exemplary dialogue system with a tuning tool which utilizes random confirmation results to perform self-monitoring and self-tuning, according to at least one embodiment of the present invention.

FIG. 10 depicts an exemplary framework 1000 in which a dialogue system 1020 with a dialogue system tuning tool 1040 applies the present invention described herein, according to at least one embodiment of the present invention. The dialogue system 1020 interacts with a user 1010 and utilizes random confirmation and its results to perform self-monitoring and self-tuning, The dialogue system 1020 may include a dialogue system front end 1030 that may be responsible for interfacing with the user 1010. For example, the dialogue system front end may comprise (not shown) a speech recognition mechanism that processes the speech of the user 1010 and produces speech recognition results. The front end 1040 may also include a text to speech system that may be responsible for interacting with the user 1010.

The dialogue system tuning tool 1040 may include a random mode enabled confirmation mechanism, which may correspond to an implementation of any of the embodiments of the present invention described herein. For example, the confirmation mechanism 200 may be deployed as the random mode enabled confirmation mechanism with the capability of automatically conducting a confirmation. The confirmation mechanism 280 with human operator confirmation may be alternatively employed as the random mode enabled confirmation mechanism. The random mode enabled confirmation mechanism may be configured in one or more of the confirmation modes described earlier. Such configuration may be changed when such need arises.

To enable self tuning, the dialogue system tuning tool 1040 may also include a self monitoring and adaptation mechanism 820 described herein. The self monitoring and adaptation mechanism 820 may interact with the confirmation mechanism 200 or 280 to collect confirmation results. The performance of the dialogue system 1020 may be monitored based on the confirmation results and feedback control may be performed when appropriate based on the collected confirmation results.

Figure 11:
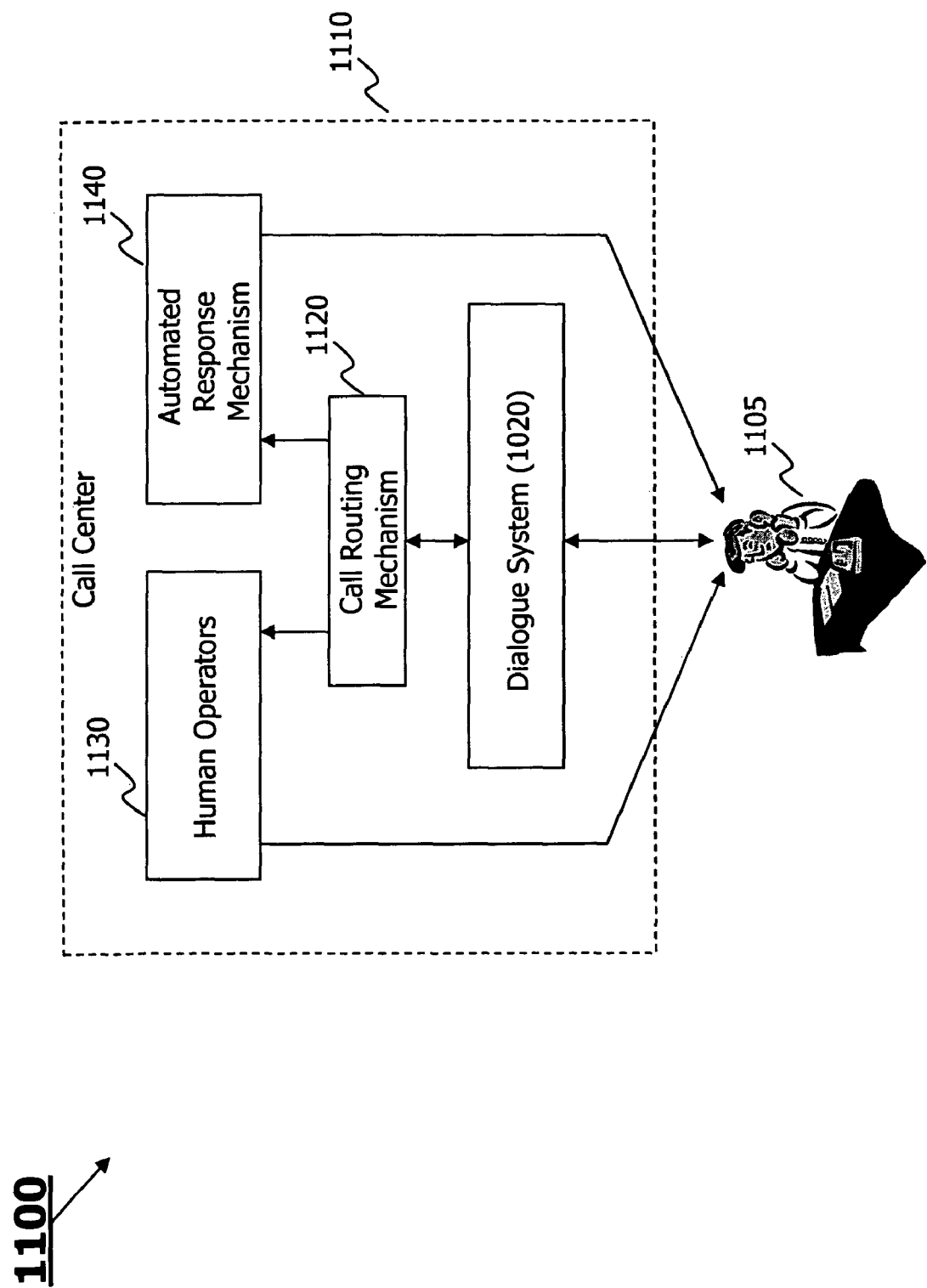
FIG. 11 depicts an exemplary call center employing a dialogue system with a tuning tool that utilizes random confirmation results to perform self-monitoring and self-tuning, according to at least one embodiment of the present invention.

FIG. 11 depicts an exemplary call center framework 1100 that employs an automatic dialogue system 1020 with a self-tuning tool realized based on at least one embodiment of the present invention. The call center framework 1100 comprises a call center 1110 and a user 1105. The call center 1110 may interact with the user 1105 via an automatic dialogue system 1020 described herein with reference to FIG. 10. Through the automatic dialogue system 1020, the call center 1110 may be able to automatically recognize the utterance of the user 1105 during a call. Confirmation may be performed during an automated speech process. Such recognized user's request may be used to route the call to a selected operator (from a plurality of human operators 1130) who may have the knowledge needed to answer the call. The call may also be routed to an automated response mechanism 1140 which may generate automatic responses to the user's inquiry and play back the answers to the user 1105 without human intervention.

The automatic dialogue system 1020 realized using the present invention described herein includes a front end that may interface directly with the user 1105 (e.g., perform speech recognition and text to speech processing) and a self tuning tool configured to performing confirmation and self tuning based on confirmation results.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A computer implemented method for speech recognition output confirmation, comprising:
    receiving an automatic speech recognition result with an associated score indicating a level of confidence with respect to the speech recognition result;
    accepting a mode selection specifying when an automated confirmation is to be performed, said mode selection chosen from a group consisting of a deterministic mode, a random mode and an integrated mode, wherein the random mode comprises randomly determining whether to perform the automated confirmation;
    determining, based on said accepted mode selection and said score, whether a confirmation is to be performed on the speech recognition result; and
    if it is determined that said confirmation is to be performed, performing an automated confirmation to verify the automatic speech recognition result by activating a confirmation construction mechanism operatively configured to carry out a speech recognition confirmation.

2. The method according to claim 1, wherein said determining step when performed for said deterministic mode comprises:
    determining whether the confidence score associated with the speech recognition result is within a pre-defined range;
    performing a confirmation if the confidence score associated with the speech recognition result is within the pre-defined range.

3. The method according to claim 1, wherein said determining step when performed for said random mode comprises:
    generating a random number;
    determining whether said generated random number is within a pre-defined range;
    checking, if the generated random number falls within said pre-defined range, whether said generated random number is less than a confirmation percentage parameter value; and
    performing a confirmation if the generated random number is within the pre-defined range and is less than the confirmation percentage parameter value.

4. The method according to claim 3, wherein the confirmation percentage parameter value indicates an expected percentage of times that a speech recognition result is to be confirmed.

5. The method according to claim 1, wherein said integrated mode comprises:
    making a deterministic decision to perform a confirmation;
    making a random decision to perform a confirmation; and
    combining the deterministic decision and the random decision to generate an integrated decision to perform a confirmation.

6. The method according to claim 1, further comprising:
    analyzing confirmation results collected to generate relevant statistics;
    utilizing the generated relevant statistics.

7. The method according to claim 6, wherein the relevant statistics include accuracy statistics indicating the performance of a speech recognizer that produces the speech recognition result and/or performance statistics indicating the performance of the speech recognizer in different ranges of the confidence score.

8. The method according to claim 6, further comprising collecting training data based on the confirmation results and the relevant statistics, wherein the training data includes at least one of the speech data based on which the speech recognition result is obtained, the confidence score associated with the speech recognition result, and the confirmation result associated with the speech recognition result.

9. The method according to claim 8, wherein said utilizing includes
    monitoring the performance of the speech recognizer based on the confirmation results and the relevant statistics;
    adapting the recognition performance of the speech recognizer by conducting re-training using at least a portion of the collected training data selected according to the relevant statistics;
    adjusting the speech recognizer in terms of how a confidence score is computed based on the relevant statistics; and/or
    adjusting a pre-defined range for a confidence score, which is used to determine whether a confirmation is to be performed.

10. A speech recognition output confirmation system, comprising:

a decision mechanism configured to decide whether a confirmation is to be performed, said decision mechanism being pre-configured to make said decision employing a mode chosen from the group consisting of a deterministic mode, a random mode, and an integrated mode, wherein the random mode comprises randomly determining whether to perform the automated confirmation to verify a speech recognition result; and a confirmation mechanism, in communication with said decision mechanism, said confirmation mechanism configured to perform the automated confirmation on the speech recognition result having an associated confidence score according to the decision made by said decision mechanism, wherein a confirmation construction mechanism carries out the automated confirmation, and generates a confirmation response.

11. The system according to claim 10, wherein the confirmation mechanism performs a confirmation employing a mode chosen from a group consisting of a manual mode in which a human operator performs the confirmation; and an automated mode in which a speech recognition mechanism is used to confirm the speech recognition result.

12. The system according to claim 10, wherein the decision mechanism comprises:

a random determiner that decides whether a confirmation is to be performed randomly; and a deterministic determiner that decides that a confirmation decision is to be performed deterministically.

13. The system according to claim 12, wherein the random determiner comprises:

a random number generator capable of generating a random number;

a random decision mechanism in communication with the random number generator, that determines whether a confirmation is to be performed based on the random number generated.

14. The system according to claim 13, further comprising a storage storing a pre-defined random confirmation range specifying a range for a random number.

15. The system according to claim 14, further comprising a storage for storing a confirmation percentage parameter value specifying a maximum percentage of randomly initiated confirmations to be performed, wherein said confirmation is to be performed when the random number falls within the pre-defined range and is less than the confirmation percentage parameter value.

16. The system according to claim 12, further comprising an integrated determiner comprising:

a deterministic decision mechanism that makes a decision based on a pre-defined range with respect to a confidence score associated with a speech recognition result; and a decision integrator, in communication with the random determiner and the deterministic determiner that makes a decision based on the random decision and the deterministic decision.

17. A system, in accordance with claim 10, further comprising:

a self-monitoring and adaptation mechanism capable of collecting confirmation results.

18. The system according to claim 17, wherein the self-monitoring and adaptation mechanism monitors the performance of a speech recognizer producing the speech recognition result through the collected confirmation results.

19. The system according to claim 17, wherein the self-monitoring and adaptation mechanism adapts the speech recognizer producing the speech recognition result based on collected confirmation results.

20. The system according to claim 17, wherein the self-monitoring and adaptation mechanism comprises:

a confirmation result logger capable of collecting confirmation results;

a confirmation information analyzer capable of analyzing the collected confirmation results to generated relevant statistics.

21. The system according to claim 20, further comprising a performance monitoring mechanism capable of monitoring the performance based on the relevant statistics.

22. The system according to claim 20, further comprising an adaptive training mechanism capable of performing re-training of a speech recognition mechanism from which the speech recognition result is received according to the relevant statistics.

23. The system according to claim 20, further comprising a confirmation range adjuster capable of adjusting the deterministic range according to the relevant statistics.

* * * * *